(12) United States Patent
Parpajola

(10) Patent No.: US 11,719,558 B2
(45) Date of Patent: Aug. 8, 2023

(54) LINEAR ENCODER WITH THERMAL STABILIZATION FUNCTIONALITY

(71) Applicant: PARPAS S.P.A., Cadoneghe (IT)

(72) Inventor: Vladi Parpajola, Cadoneghe (IT)

(73) Assignee: PARPAS S.P.A., Cadoneghe (IT)

( * ) Notice: Subject to any disclaimer, the term of this patent is extended or adjusted under 35 U.S.C. 154(b) by 44 days.

(21) Appl. No.: 17/439,255

(22) PCT Filed: Mar. 13, 2020

(86) PCT No.: PCT/IB2020/052279
§ 371 (c)(1),
(2) Date: Sep. 14, 2021

(87) PCT Pub. No.: WO2020/188432
PCT Pub. Date: Sep. 24, 2020

(65) Prior Publication Data
US 2022/0187104 A1  Jun. 16, 2022

(30) Foreign Application Priority Data
Mar. 15, 2019 (IT) .......... 102019000003813

(51) Int. Cl.
*G01D 5/244* (2006.01)
*G01D 5/347* (2006.01)

(52) U.S. Cl.
CPC ..... *G01D 5/24442* (2013.01); *G01D 5/34707* (2013.01); *G01D 5/34746* (2013.01)

(58) Field of Classification Search
CPC ........... G01D 5/24442; G01D 5/34707; G01D 5/34776
See application file for complete search history.

(56) References Cited

U.S. PATENT DOCUMENTS

| 4,444,504 A * | 4/1984 | Takizawa | G01B 3/002 33/706 |
| 6,399,940 B1 * | 6/2002 | Cui | G01D 5/34715 250/237 G |

(Continued)

FOREIGN PATENT DOCUMENTS

| DE | 9422027 | 9/1997 |
| EP | 2908100 | 8/2015 |
| GB | 2079943 | 1/1982 |

OTHER PUBLICATIONS

PCT International Search Report and Written Opinion dated Oct. 7, 2020 for PCT/IB2020/052279.

*Primary Examiner* — Jennifer D Bennett
(74) *Attorney, Agent, or Firm* — McCarter & English, LLP

(57) ABSTRACT

A linear encoder for numeric-control machine tools is provided that includes: a substantially rectilinear section-bar, which is adapted to be fixed on the structure of the machine tool; a substantially rectilinear scale strip, which is fixed on the section-bar so as to extend along the section-bar parallel to the section-bar longitudinal axis; a movable slider which is fitted/mounted on the section-bar so as to be able to move along the section-bar parallel to the section-bar longitudinal axis and skimming the scale strip, and which is adapted to be rigidly fixed to the movable piece of the machine tool; an electronic reading apparatus which is at least partially placed aboard the movable slider and is adapted to read the position of the movable slider on the scale strip; and a thermal-stabilization device which is adapted to bring and maintain substantially the whole scale strip stably at a predetermined target temperature.

15 Claims, 2 Drawing Sheets

(56) References Cited

U.S. PATENT DOCUMENTS

| | | | |
|---|---|---|---|
| 2006/0220478 A1* | 10/2006 | Emoto | G03F 7/70758 310/58 |
| 2013/0248698 A1* | 9/2013 | Ezaki | G01D 5/34715 250/231.1 |
| 2015/0233738 A1* | 8/2015 | Vokinger | G01D 5/34746 250/231.1 |
| 2018/0073869 A1* | 3/2018 | Schweikl | G01D 5/34769 |

\* cited by examiner

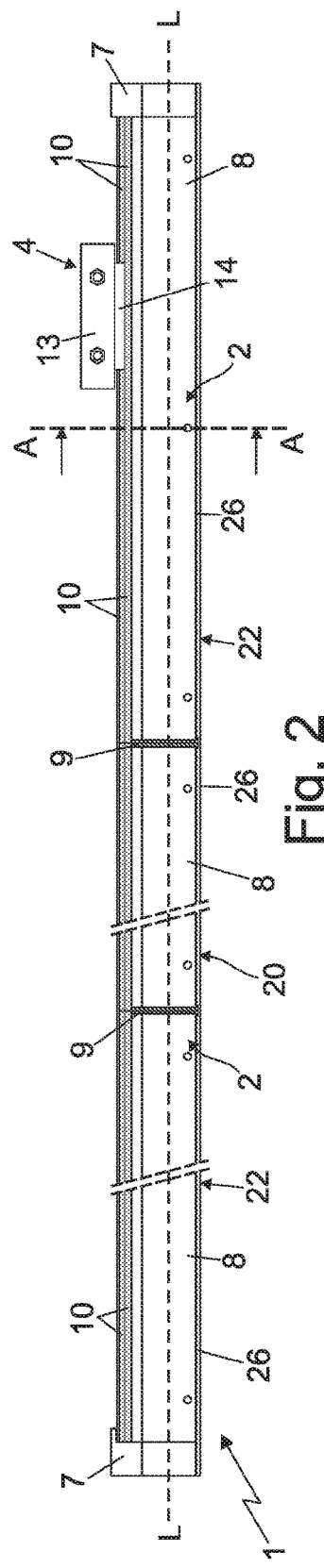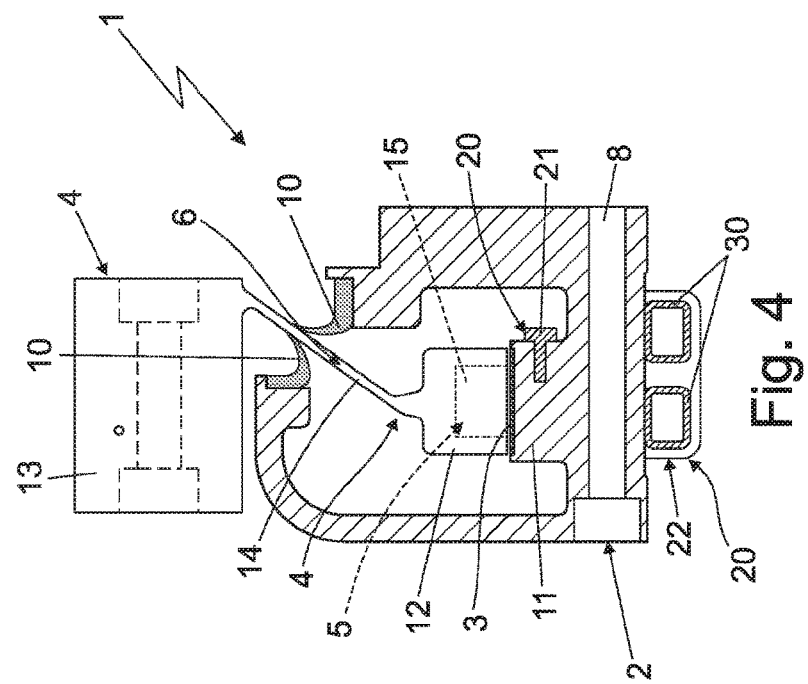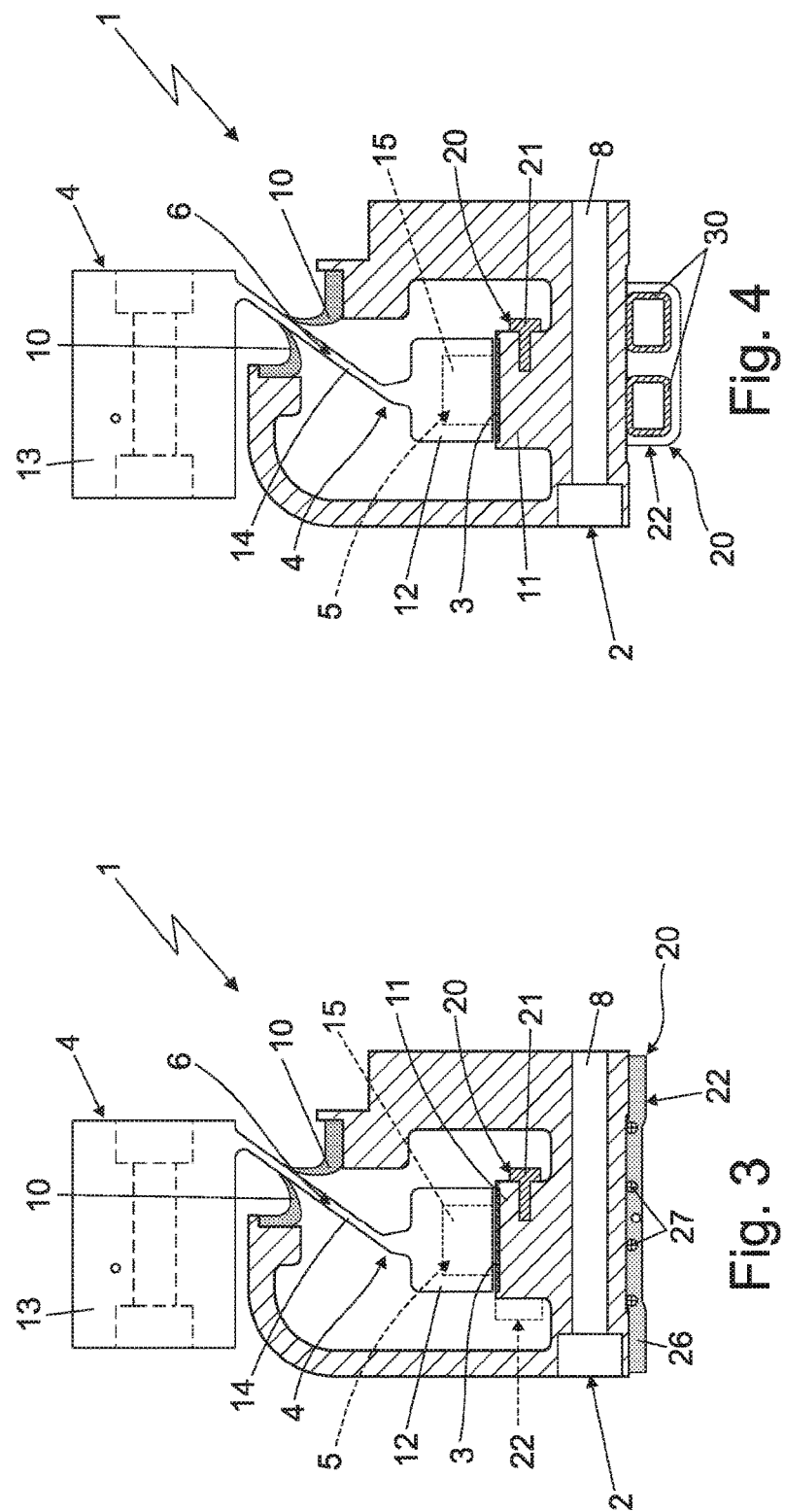

LINEAR ENCODER WITH THERMAL STABILIZATION FUNCTIONALITY

CROSS-REFERENCE TO RELATED APPLICATIONS

This patent application is a 35 U.S.C. § 371 National Stage filing of International Application No. PCT/M2020/052279, filed on Mar. 13, 2020, which application claims priority from Italian patent application no. 102019000003813 filed on Mar. 15, 2019, the entire disclosure of which is incorporated herein by reference.

TECHNICAL FIELD

The present invention relates to a linear encoder.

In more detail, the present invention relates to a linear encoder for large numerical-control machines particularly suitable to be used in large numerical-control gantry milling machines. Use to which the following disclosure will explicitly refer without however losing its general nature.

BACKGROUND ART

As is well known, in large numerical-control gantry milling machines, the tool-holder head is fixed on a rectilinear, horizontal load-bearing beam with a high-rigidity structure, which extends horizontally above the piece-holding platform and has the two axial ends resting in sliding manner on two elevated lateral shoulders rising from the bedplate, from opposite sides of the piece-holding platform.

The tool-holder head is capable to move along the load-bearing beam parallel to the longitudinal axis of the beam, i.e. in a first horizontal direction. The load-bearing beam, in turn, extends perpendicularly to the two lateral shoulders and is able to move horizontally along the two lateral shoulders perpendicularly to its longitudinal axis, i.e. in a second horizontal direction orthogonal to said first horizontal direction.

The position of the tool-holder head along the load-bearing beam and the position of the load-bearing beam on the two lateral shoulders are usually detected by a series of linear encoders, usually also called linear-position transducers, which are placed on the load-bearing beam and on the two lateral shoulders.

The linear encoders most commonly used in numerical-control gantry milling machines consist of: a rectilinear section-bar of suitable length, which is usually made of metal material and has a substantially U-shaped cross-section; a rectilinear scale strip which has a ribbon-like structure and is firmly fixed to the bottom of the groove delimited by the rectilinear section-bar, so as to extend parallel to the longitudinal axis of the section-bar substantially for the entire length of the same section-bar; a movable slider which is capable of moving along the groove of the rectilinear section-bar, parallel to the longitudinal axis of the section-bar and skimming the rectilinear scale strip; and an electronic reading apparatus which is capable of reading the position of the slider directly on the rectilinear scale strip, and to output an analogue or digital signal indicating the position of the movable slider along the rectilinear section-bar.

In more detail, in most common models of linear encoder the scale strip is provided with a succession of notches or reference marks that are regularly spaced on the top face of the scale strip, for the entire length of the same strip, and the electronic reading apparatus is provided with an optoelectronic sensor which is located aboard the movable slider, and is capable of detecting the presence of the notches or reference marks on the section of the scale strip facing/aligned to the movable slider.

The rectilinear section-bar is traditionally rigidly fixed to the load-bearing beam or to the lateral shoulder parallel to the direction of movement of the piece, while the movable slider is rigidly fixed to the tool-holder head or to the end of the load-bearing beam, i.e. to the moving piece.

Unfortunately, the accuracy of the linear encoders described above decreases as the length of the device increases and reaches unacceptable values when the length exceeds 5-6 meters.

In fact, the rectilinear section-bar is normally fixed in rigid manner to the metal structure of the numerical-control machine, and is therefore subjected to thermal expansions of various nature that unfortunately can reach significant values parallel to the section-bar longitudinal axis. Since it is traditionally made in one piece, the scale strip is obviously subject to the same drawbacks with all the problems that this entails.

To at least partially overcome these problems, in the best linear encoders on the market the rectilinear section-bar is normally made of a metal material having a thermal expansion coefficient comparable to that of the metal structure of the numerical-control machine, while the scale strip is usually made of carbon steel or glass.

Despite these tricks, large gantry milling machines currently on the market cannot achieve machining accuracies of more than one hundredth of a millimetre.

In fact, when the load-bearing beam and/or the lateral shoulders exceed 5-6 metres in length, the errors due to thermal expansions on linear encoders, or rather on the scale strip of the linear encoders, significantly affect the accuracy with which the control system of the numerical-control machine can determine the absolute position of the tool.

DISCLOSURE OF INVENTION

Object of the present invention is to produce a linear encoder for numerical-control machine tools that guarantees very high precision even when the linear encoder exceeds 5-6 metres in length.

In accordance with these objectives, according to the present invention there is provided a linear encoder as defined in claim 1, and preferably, though not necessarily, in any of the claims depending on it.

BRIEF DESCRIPTION OF THE DRAWINGS

The present invention will now be described with reference to the accompanying drawings, illustrating a non-limiting implementation example:

FIG. 2 is a front view of the linear encoder shown in FIG. 1, with parts removed for clarity's sake;

FIG. 3 is a side view of the linear encoder shown in FIGS. 1 and 2, sectioned along the A-A section line; whereas FIG. 4 is a sectioned side view of a different embodiment of the linear encoder shown in FIGS. 1, 2, and 3, with parts removed for clarity's sake.

BEST MODE FOR CARRYING OUT THE INVENTION

Figure 1:
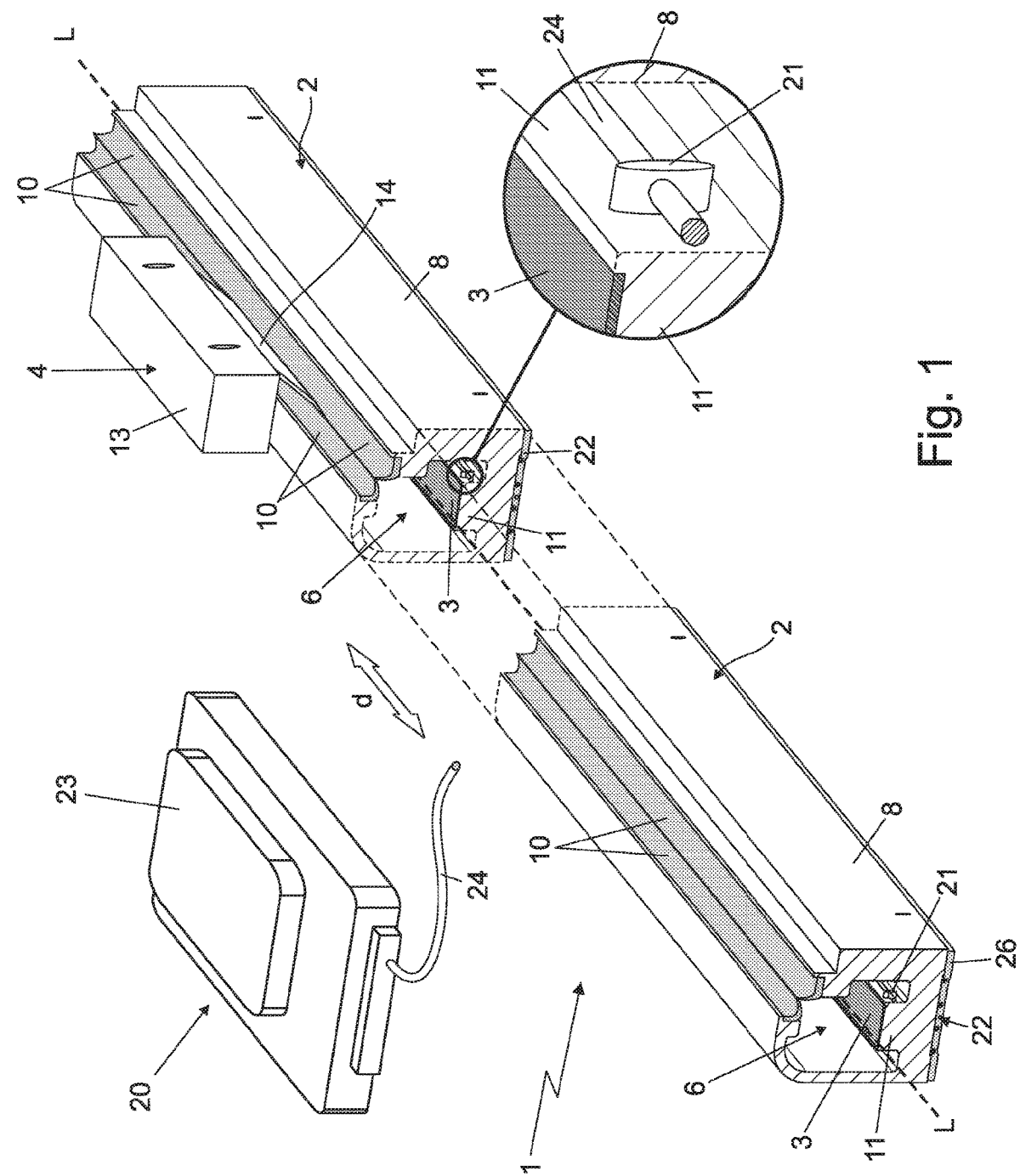
FIG. 1 is an axonometric view of a linear encoder made according to the teachings of the present invention, with parts in section and parts removed for clarity.

With reference to FIGS. 1, 2, and 3, number 1 denotes as a whole a linear encoder, also called linear-position transducer, particularly suitable for being used in large numerical-control gantry milling machines and, more generally, in large numerical-control machine tools.

The linear encoder 1 firstly comprises: a substantially rectilinear, bearing section-bar 2 preferably made of metal material, which is adapted to be fixed in substantially rigid manner to the structure (not shown) of the machine tool with its longitudinal axis L substantially parallel to the direction of movement d of the piece of the machine tool, preferably by means of a series of transversal anchoring bolts (not shown) suitably distributed along the entire length of the section-bar 2; a substantially rectilinear scale strip 3, which preferably has a ribbon-like structure, and is firmly fixed to the section-bar 2 so as to extend along the section-bar 2 parallel to the section-bar longitudinal axis L, preferably substantially for the whole length of the section-bar 2; and a movable slider 4 which is fitted/mounted on the section-bar 2 so as to be able to move along the section-bar 2, parallel to the section-bar longitudinal axis L and skimming the scale strip 3, and which is adapted to be rigidly fixed to the movable piece (not shown) of the machine tool whose position is desired to be known, preferably by means of transversal anchoring bolts (not shown).

In more detail, the central part of section-bar 2 is preferably structured so as to be rigidly fixed/anchored to the machine tool structure (not shown), whereas the two ends and other intermediate parts of section-bar 2 are preferably structured so as to be floatingly fixed/anchored to the machine tool structure (not shown).

In addition, the linear encoder 1 additionally comprises an electronic reading apparatus 5 which is at least partially located on the movable slider 4 so as to move skimming the scale strip 3, and is adapted to read the position of the movable slider 4 directly on the scale strip 3. Preferably, the electronic reading apparatus 5 is additionally adapted to output an analogue or digital signal indicating the position of movable slider 4 along section-bar 2.

In more detail, the scale strip 3 preferably extends seamlessly along the section-bar 2. In other words, scale strip 3 is preferably monolithic.

In addition, scale strip 3 is preferably provided with a series of reference marks, signs and/or markers (not shown in the figures) preferably of optical or magnetic type, which are substantially evenly and seamlessly distributed along the entire length of scale strip 3.

The electronic reading apparatus 5, in turn, is structured so as to be able to detect the presence of the reference mark, signs and/or markers present on the facing section/segment of scale strip 3, and to determine the position of movable head 4 along scale strip 3, and therefore along section-bar 2, on the basis of the presence/spatial arrangement of said reference marks, signs and/or markers.

With reference to FIGS. 1, 2, and 3, in the example shown, in particular, the section-bar 2 is preferably shaped so as to form/delimit inside itself a rectilinear longitudinal groove/channel 6 which extends for the whole length of section-bar 2 parallel to the longitudinal axis L, and the scale strip 3 is preferably accommodated inside said rectilinear groove 6 locally parallel to the section-bar axis L.

Preferably section-bar 2 is moreover closed/sealed at its two axial ends by two terminals 7 preferably made of metal material.

In more detail, in the example shown, the section-bar 2 preferably has a substantially U-shaped cross-section.

In addition, the substantially rectilinear section-bar 2 is preferably made of steel, and is preferably divided into a series of monolithic segments 8 preferably having all the same length and which are arranged one aligned and joined to the other, preferably with the interposition of joining elements 9 preferably made of polymeric material.

In the example shown, in particular, the monolithic segments 8 have a length preferably less than 1.5 m (metres).

With particular reference to FIGS. 1, 2, and 3, preferably the linear encoder 1 additionally comprises a pair of longitudinal gaskets 10 preferably made of elastomeric material, which extend parallel to the section-bar longitudinal axis L, are fixed to the section-bar 2 on the sides of the upper mouth of rectilinear groove 6, and are facing and wide tightened to one another substantially for the whole length of section-bar 2, so as to close the mouth of rectilinear groove 6 for preventing dust and other contaminants from reaching the scale strip 3.

Preferably, the longitudinal gaskets 10 moreover have a lip structure and are fixed to the two longitudinal edges of section-bar 2 so as to protrude one towards the other and touch each other at the centreline of the mouth of rectilinear groove 6.

With particular reference to FIGS. 1 and 3, the scale strip 3, on the other hand, is preferably firmly fixed to the bottom of rectilinear groove 6.

In addition, the scale strip 3 preferably consists of a ribbon-like strip of metal material which is preferably made of carbon steel and preferably extends without interruptions substantially along the whole length of section-bar 2.

In more detail, in the example shown the scale strip 3, or rather the ribbon-like strip, preferably rests/is located on the top of a longitudinal rib 11 which, in turn, protrudes from the bottom of rectilinear groove 6 towards the mouth of groove 6, and extends parallel to the section-bar longitudinal axis L substantially for the whole length of section-bar 2, or rather of each monolithic segment 8.

Preferably, the ribbon-like strap additionally has, on the exposed face, a series of graphic signs or engravings which are evenly spaced without interruptions along the whole length of the strip.

In other words, the scale strip 3 is provided with a visible micrometric graded scale and the electronic reading apparatus 5 is adapted to read said graded scale.

In a different embodiment, the ribbon-like strip may also be made of glass and/or composite material. In addition, the ribbon-like strip may also have, in addition to or in place of the graphic signs, a series of transversal magnetic bands.

With reference to FIGS. 1, 2, and 3, the movable slider 4, on the other hand, is preferably movable along the section-bar 2 without touching the section-bar 2.

Preferably, the movable slider 4 comprises in addition: a reading head 12 which is accommodated in axially sliding manner within the longitudinal groove 6 of section-bar 2, and also locally skims the scale strip 3; a fixing block 13 which is permanently placed outside of the section-bar 2, and is structured so as to be rigidly fixed/fixable to the movable piece of the numerical-control machine; and finally a connecting arm 14 which rigidly connects the external fixing block 13 to the reading head 12, so that reading head 11 and fixing block 13 move together in the direction d. Preferably, the connecting arm 14 additionally has a plate-like structure parallel to the section-bar longitudinal axis L, so that the longitudinal gaskets 10 can be more easily deformed/spread apart while moving along the upper mouth of rectilinear groove 6.

In the example shown, in addition, reading head 12, fixing block 13 and connecting arm 14 are preferably made in one piece, preferably of metal material.

With particular reference to FIG. 3, the electronic reading apparatus 5, on the other hand, preferably includes an optoelectronic sensor 15 which is placed in the reading head 11 of movable slider 4 so as to skim the scale strip 3, and is adapted to detect the presence and/or arrangement of the graphic signs or engravings present on scale strip 3.

In a different embodiment, however, the electronic reading apparatus 5 could include, in addition to or in place of optoelectronic sensor 15, a magnetic sensor capable of detecting the presence and/or arrangement of the magnetic bands.

With reference to FIGS. 1, 2 and, 3, differently from the currently known linear encoders, the linear encoder 1 moreover comprises an active thermal-stabilization device 20, which is adapted to bring and maintain substantially the whole scale strip 3 continuously at a predetermined and substantially constant, target temperature $T_0$ which value preferably ranges between +20° C. and +90° C.

In more detail, the scale strip 3 is preferably fixed to the section-bar 2 with the capability of freely expanding with respect to the latter parallel to the longitudinal axis L and vice versa.

The thermal-stabilization device 20, on the other hand, is preferably adapted to selectively and actively heat and/or cool the rectilinear section-bar 12, so as to keep the temperature of substantially every single point of the scale strip 3 within a tolerance band of predetermined width, straddling the abovementioned target temperature $T_0$. Preferably, the target temperature $T_0$ is moreover located in the middle of the above tolerance band and/or the width of the tolerance band is preferably lower than 2° C. and more conveniently lower than 1° C.

In other words, the thermal-stabilization device 20 is preferably adapted to maintain the temperature of substantially every single point of scale strip 3 around the target temperature $T_0$, with a tolerance of less than ±1° C. and optionally also less than ±0.5° C.

In the example shown, in particular, the section-bar 2 is preferably longitudinally divided into a series of sample sectors preferably having all the same length, and each of which accommodates a respective sample section of the scale strip 3.

The thermal-stabilization device 20, in turn, is preferably structured to selectively and independently heat and/or cool the individual sample sectors of section-bar 2, so as to continuously maintain the temperature of each sample section of scale strip 3 around the above mentioned target temperature $T_0$.

In more detail, the active thermal-stabilization device 20 preferably comprises: a series of temperature sensors 21 suitably distributed along the section-bar 2 so as to detect, in real time, the temperature of scale strip 3 at different points thereof; a succession of thermo-active elements 22 discrete and distinct to one another, which are suitably distributed along the section-bar 2, and are structured to cool and/or heat the sample sector of the section-bar 2 to which they are fixed, and the scale strip 3 integral with it; and a control unit 23 which is preferably located outside the section-bar 2, and is adapted to command the individual thermo-active elements 22 independently from one another, according to the signals arriving from the temperature sensors 21.

In more detail, the control unit 23 is programmed/configured to selectively turn each thermo-active element 22 on and off when the temperature sensor(s) 21 on the same sample sector of the section-bar 2 detect that the local temperature of the scale strip 3 deviated too much from the target temperature $T_0$, so as to restore the local temperature of the scale strip 3 in the neighbourhood of the target temperature $T_0$.

In other words, the control unit 23 is preferably programmed/configured to turn on and off each thermo-active element 22 when the local temperature of the scale strip 3 goes outside of said tolerance band centred on target temperature $T_0$.

In the example shown, in particular, the temperature sensors 21 are preferably substantially evenly spaced along the section-bar 2 and the scale strip 3, and each sample sector of section-bar 2 accommodates at least one and more conveniently a plurality of temperature sensors 21.

The thermo-active elements 22, on the other hand, are preferably placed each in contact with a respective sample sector of section-bar 2 so as to be able to transfer/absorb heat to/from the section-bar 2 by conduction, and preferably extend over the section-bar 2 substantially along the entire length of the same sample sector of section-bar 2.

In other words, the individual thermo-active elements 22 have an oblong structure and preferably extend on the section-bar 2 aligned one after the other.

With reference to FIGS. 1, 2, and 3, in the example shown, in particular, the section-bar 2 and the scale strip 3 are preferably divided into a series of sample sectors/sections less than 0.5 m (metres) in length.

In addition, the thermal-stabilization device 20 is preferably structured to maintain the scale strip 3 at a target temperature $T_0$ higher than ambient temperature.

In other words, the thermal-stabilization device 20 is preferably structured so to solely heat the individual sample sectors of section-bar 2.

In the example shown, in particular, the target temperature $T_0$ is preferably equal to +50° C.

As a result, the thermo-active elements 22 are preferably heating members which, on command, are adapted to locally heat up the section-bar 2 and the scale strip 3 integral to it.

The control unit 23, in turn, is preferably programmed/configured to selectively turn on and off each thermo-active element 22 with heating function when the temperature sensor(s) 21 on the corresponding sample sector of section-bar 2 detect that the local temperature of the scale strip 3 dropped excessively below the target temperature $T_0$, so as to locally heat up the section-bar 2 and bring the local temperature of scale strip 3 back in the neighbourhood of the target temperature $T_0$.

With reference to FIGS. 1 and 3, in the example shown, in particular, the temperature sensors 21 are preferably located within the longitudinal groove 6 of section-bar 2, and are preferably distributed on the section-bar 2 so that each monolithic segment 8 of section-bar 2 accommodates at least one and more conveniently a plurality of temperature sensors 21.

In addition, each temperature sensor 21 is preferably accommodated/inserted in the longitudinal rib 11 of section-bar 2, immediately beneath the scale strip 3. Preferably, the temperature sensors 21 finally communicate with the control unit 23 via an optical fibre 24 which, in the example shown, extends inside the rectilinear groove 6 of section-bar 2, substantially for the whole length of section-bar 2.

In more detail, the temperature sensors 21 are crossed in sequence by the optical fibre 24 that ends at control unit 23.

The thermo-active elements 22, on the other hand, are preferably fixed directly on the section-bar 2, outside of the longitudinal groove 6.

The thermo-active elements 22, in addition, are preferably placed outside of section-bar 2, along the wall of the section-bar directly supporting the scale strip 3.

In the example shown, in particular, the thermo-active elements 22 are preferably fixed on the outer surface of section-bar 2, along the wall forming the bottom of the rectilinear groove 6 and having the longitudinal rib 11 on the opposite side.

Finally, each thermo-active element 22 preferably consists of a resistor adapted for producing heat by Joule effect, and the control unit 23 is preferably adapted to supplying electric energy to each resistor separately and independently from the other resistors, so as to power on each resistor separately from the others according to the signals arriving from the temperature sensors 21.

In more detail, with particular reference to FIG. 3, in the example illustrated, each thermo-active element 22 preferably comprises: a ribbon-type sheet 26 of thermo-conductive and optionally also electrically-insulating material, which extends adherently to the external surface of the rectilinear section-bar, and is preferably made of polymeric material; and one or more wires 27 made of electrically conductive material, which are embedded in the ribbon-like sheet 26 so as to be skimmed over the surface of section-bar 2 and be able to transmit the heat produced directly to section-bar 2.

In other words, each thermo-active element 22 preferably has a ribbon-like structure.

The control unit 23, in turn, is electrically connected to the electric wires 27 of each heater or resistor 22 so as to circulate electric current within the same electric wires 27.

Operation of linear encoder 1 is easily inferable from the above and does not require further explanations.

As regards instead the thermal-stabilization device 20, during operation of the numerical-control machine, the control unit 23 activates and deactivates each thermo-active element 22 according to the signals arriving from the temperature sensor(s) 21 present on the corresponding sample sector of section-bar 2, so as to maintain the local temperature of the scale strip 3 in the neighbourhood of the target temperature $T_0$.

The advantages connected with the presence of the thermal-stabilization device 20 are remarkable.

Firstly, experimental tests highlighted that keeping the scale strip 3 at a predetermined and substantially constant temperature (i.e. the target temperature $T_0$) during operation of the numerical-control machine, allows to practically eliminate the errors due to thermal expansion of scale strip 3 and section-bar 2, even when the linear encoder 1 exceeds 8 metres in length.

Moreover, since it is always maintained around target temperature $T_0$, the scale strip 3 can be made of materials that are less rigid and fragile and cheaper than those currently employed for the same component, simplifying and reducing the production costs of the linear encoder. The low thermal expansion coefficient, in fact, is no longer a fundamental requirement of the material used to produce the scale strip 3.

It is finally clear that modifications and variations can be made to the linear encoder 1 described above without however departing from the scope of the present invention.

For example, in a different embodiment hatched in FIG. 3, instead of being placed outside of section-bar 2, the thermo-active elements 22 of thermal-stabilization device 20, and more specifically the resistors, can be placed inside the longitudinal groove 6 of section-bar 2, preferably in abutment against the longitudinal rib 11.

With reference to FIG. 4, in a further embodiment, each thermo-active element 22 of thermal-stabilization device 20 comprises one or more pipings 30 preferably made of metal material, which are arranged in contact with the section-bar 2 so as to exchange heat with the section-bar 2, and are adapted to be crossed by a heat transfer fluid at a given temperature (e.g. water or oil), which preferably has a nominal temperature above or below the target temperature $T_0$, and therefore is able to heat up or cool down the section-bar 2 and the scale strip 3.

In this embodiment, the control unit 23 is adapted to regulate the flow of the heat transfer fluid along the piping or pipings 30 of each thermo-active element 22 according to the signals arriving from the temperature sensor or sensors 21 present on the same sample sector of section-bar 2, so as to maintain the local temperature of the scale strip 3 in the neighbourhood of the target temperature $T_0$.

The invention claimed is:

1. A linear encoder (1) comprising: a substantially rectilinear section-bar (2) which is adapted to be fixed on a structure of a machine tool; a substantially rectilinear scale strip (3) which is fixed on the section-bar (2) so as to extend along said section-bar (2) parallel to a section-bar longitudinal axis (L); a movable slider (4) which is fitted or mounted on the section-bar (2) so as to be able to move along the section-bar parallel to the section-bar longitudinal axis (L) and skimming the scale strip (3), and which is adapted to be rigidly fixed to a movable piece of the machine tool; and an electronic reading apparatus (5) which is at least partially located aboard the movable slider (4) and is adapted to read a position of the movable slider (4) on the scale strip (3);

said linear encoder (1) further comprising an active thermal-stabilization device (20) which is adapted to bring and maintain substantially the whole scale strip (3) stably at a predetermined target temperature ($T_0$);

wherein the section-bar (2) is longitudinally divided into a series of sample sectors, each of which hosts a respective sample section of the scale strip (3); the thermal-stabilization device (20) being structured so as to selectively and independently heat and/or cool the individual sample sectors of the section-bar (2), to maintain a temperature of each sample section of the scale strip (3) around said target temperature ($T_0$).

2. Linear encoder according to claim 1, wherein the thermal-stabilization device (20) is adapted to selectively heat and/or cool the section-bar (2), so as to maintain the temperature of substantially each individual point of the scale strip (3) within a predetermined tolerance band, straddling said target temperature ($T_0$).

3. Linear encoder according to claim 2, wherein the width of said tolerance band is lower than 2° C.

4. Linear encoder according to claim 1, wherein the active thermal-stabilization device (20) comprises: a series of temperature sensors (21) distributed along the section-bar (2) so as to detect the temperature of the scale strip (3) at different points thereof; a succession of thermo-active elements (22) which are distributed along the section-bar (2), and are structured so as to heat and/or cool the sample sector of the section-bar (2) to which the thermo-active elements (22) are fixed, and the scale strip (3) integral with it the section-bar (2); and a control unit (23), which is adapted to command the individual thermo-active elements (22) independently from one another, according to signals arriving from said temperature sensors (21).

5. Linear encoder according to claim 4, wherein the thermo-active elements (22) are resistors.

6. Linear encoder according to claim 4, wherein each thermo-active element (22) is oblong in shape and extends on the section-bar (2) substantially for the entire length of the sample sector of the section-bar (2) on which the same thermo-active element (22) is fixed.

7. Linear encoder according to claim 1, wherein the section-bar (2) is shaped so as to internally form or delimit a rectilinear groove or channel (6) that extends parallel to the section-bar longitudinal axis (L); the scale strip (3) being accommodated inside said rectilinear groove or channel (6).

8. Linear encoder according to claim 4, wherein the section-bar (2) is shaped so as to internally form or delimit a rectilinear groove or channel (6) that extends parallel to the section-bar longitudinal axis (L); and wherein the temperature sensors (21) are placed inside said rectilinear groove or channel (6).

9. Linear encoder according to claim 7, wherein the scale strip (3) is placed on a longitudinal rib (11) that protrudes from a bottom of the rectilinear groove or channel (6).

10. Linear encoder according to claim 4, wherein the scale strip (3) is placed on a longitudinal rib (11) that protrudes from a bottom of the rectilinear groove or channel (6), and wherein the temperature sensors (21) are located on said longitudinal rib (11).

11. Linear encoder according to claim 7, wherein the thermo-active elements (22) are placed inside said rectilinear groove or channel (6).

12. Linear encoder according to claim 6, wherein the section-bar (2) has a substantially U-shaped cross-section.

13. Linear encoder according to claim 7, wherein an upper mouth of said rectilinear groove or channel (6) is closed by a pair of longitudinal gaskets (10) that extend parallel to the section-bar longitudinal axis (L), are fixed to the section-bar (2) at the sides of the upper mouth of the rectilinear groove or channel (6) and are one wide tightened to the other.

14. Linear encoder according to claim 1, wherein the scale strip (3) has a ribbon-like structure.

15. Linear encoder according to claim 1, wherein the target temperature ($T_0$) ranges between +20° C. and +90° C.

\* \* \* \* \*